United States Patent
Ido (10) Patent No.: US 7,296,081 B2
(45) Date of Patent: Nov. 13, 2007

(54) PACKET RECEPTION APPARATUS AND PACKET RECEPTION METHOD

(75) Inventor: Daiji Ido, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 741 days.

(21) Appl. No.: 10/333,587

(22) PCT Filed: May 21, 2002

(86) PCT No.: PCT/JP02/04901

§ 371 (c)(1),
(2), (4) Date: Jan. 24, 2003

(87) PCT Pub. No.: WO02/098109

PCT Pub. Date: Dec. 5, 2002

(65) Prior Publication Data

US 2003/0156544 A1    Aug. 21, 2003

(30) Foreign Application Priority Data

May 29, 2001  (JP) .............................. 2001-161398

(51) Int. Cl.
G06F 15/16  (2006.01)
(52) U.S. Cl. .................. 709/231; 709/224; 370/242
(58) Field of Classification Search ............... 709/231, 709/247, 200–203, 217–227, 232–234; 714/748; 307/241–242
See application file for complete search history.

(56) References Cited

U.S. PATENT DOCUMENTS

| 5,450,425 | A | * | 9/1995 | Gunn et al. .................. 714/819 |
| 6,031,818 | A | | 2/2000 | Lo et al. |
| 6,247,150 | B1 | * | 6/2001 | Niemela ..................... 714/701 |
| 6,587,985 | B1 | * | 7/2003 | Fukushima et al. ......... 714/748 |
| 6,680,955 | B1 | * | 1/2004 | Le .............................. 370/477 |
| 6,757,256 | B1 | * | 6/2004 | Anandakumar et al. .... 370/252 |

(Continued)

FOREIGN PATENT DOCUMENTS

EP    1061699    12/2000

(Continued)

OTHER PUBLICATIONS

Douglas E. Comer, Internetworking with TCP/IP, vol. III: Client-Server Programming and Applications, Linux/Posix, US, Prentice Hall, Sep. 11, 2000, Section 29 (29.13, 29.16), ISBN: 0130320714, "Network Construction with TCP/IP, Linux/POSIX Socket Version vol. III, Client-Server Programming and Applications," with English translation of p. 417 lines 1-7, pp. 416-418 and 420.

*Primary Examiner*—Moustafa Meky
(74) *Attorney, Agent, or Firm*—Stevens, Davis, Miller & Mosher, LLP (57) ABSTRACT

Without RTP receiver 106 receiving a BYE packet, end time determiner 111 takes into consideration packet loss information from packet loss monitor 110 and the situation regarding RTP packet reception from RTP receiver 106, and determines media transmission from the server is completed, and instructs control command transmitter-receiver 109 to stop the media, provided that the situation where there has been no packet loss and no RTP packet has been received. Moreover, where RTP receiver 106 does not receive data, the end of media is not determined if a packet loss has occurred in a lower layer.

8 Claims, 8 Drawing Sheets

U.S. PATENT DOCUMENTS

| | | | |
|---|---|---|---|
| 2003/0163772 A1* | 8/2003 | Jaworski | 714/704 |
| 2004/0064542 A1* | 4/2004 | Williams | 709/224 |

FOREIGN PATENT DOCUMENTS

| | | |
|---|---|---|
| JP | 02030253 | 1/1990 |
| JP | 04307838 | 10/1992 |
| JP | 06053990 | 2/1994 |
| JP | 10215278 | 8/1998 |
| JP | 11341046 | 12/1999 |
| JP | 2000078557 | 3/2000 |
| JP | 2000174846 | 6/2000 |
| JP | 2002135310 | 5/2002 |

* cited by examiner

PACKET RECEPTION APPARATUS AND PACKET RECEPTION METHOD

TECHNICAL FIELD

The present invention relates to a packet receiving apparatus and a packet receiving method.

BACKGROUND ARTS

There is a technique typically referred to as SMIL (Synchronized Multimedia Integration Language). This technique has been standardized by W3C (World Wide Web Consortium) as a technique for describing spatial and temporal layout by combining contents that contain text, static images, video, and sound. The SMIL description language differs from the Hyper Text Markup Language (HTML) in that time information is included in the content. Incidentally, the HTML description language is the most popular language for use on the Internet.

Now a method will be explained here whereby a client plays back content that is on a server and made in the SMIL description language, via a network.

Figure 1:
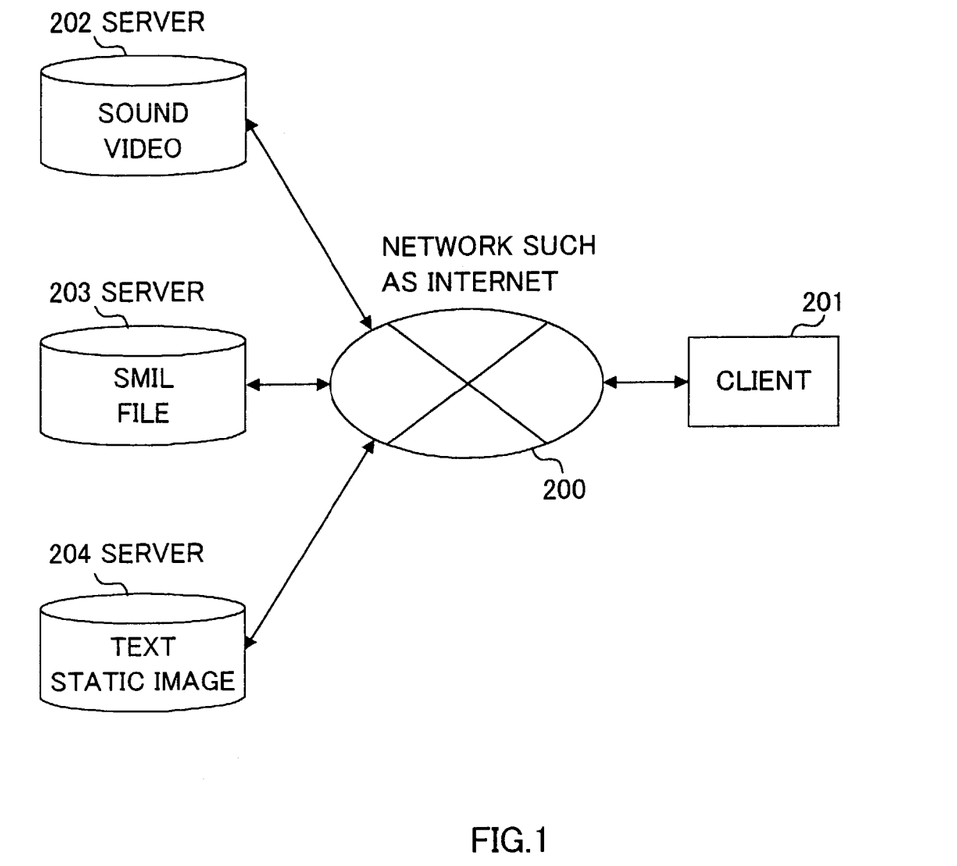
FIG. 1 is a diagram illustrating content distribution using SMIL.

FIG. 1 is a diagram illustrating content distribution using SMIL. In this figure, client 201 accesses server 203 over network 200, acquires an SMIL file in which content is described, and interprets the acquired SMIL file. Next, the media described in the SMIL file, such as text, static images, video, and sound, is acquired from server 202 and server 204. Then, based on the time information described in the SMIL file, each media (text, static images, video, and music) plays back at appropriate time. Incidentally, the SMIL file, the sound and video, and the text and static image, that in this figure are stored in respective servers 202, 203, and 204, can be stored in one server.

Now, the transmission method for the SMIL file and for each media will be explained.

The communication protocol typically used to transmit media files including SMIL files, static image files, and text files from servers 202, 203, and 204 to client 201 is referred to as TCP (Transmission Control Protocol). This TCP is a reliable protocol as HTML and is widely used on the Internet. In contrast, the communication protocol frequently used to transmit temporally continuous data such as sound data and video data is RTP (Real-time Transport Protocol) and UDP (User Datagram Protocol). As for the lower protocol to transmit TCP or RTP/UDP, the IP (Internet Protocol) protocol is common.

The above TCP, RTP, UDP, and IP protocols are all standardized by the IETF (Internet Engineering Task Force) and spread widely on the Internet.

Next, a content description method for SMIL files will be briefly explained.

Figure 2:
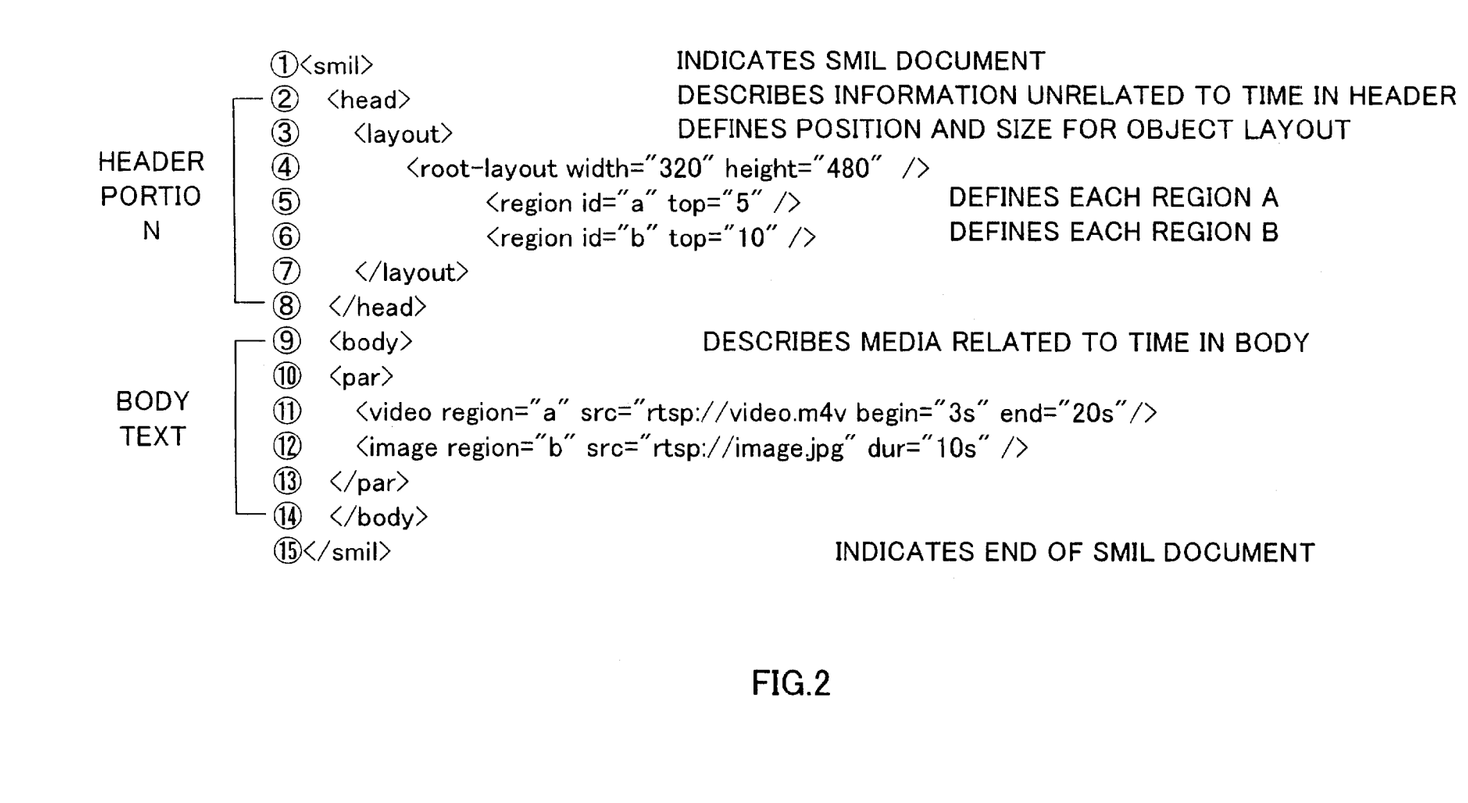
FIG. 2 is a diagram illustrating content described in SMIL.

FIG. 2 is a diagram showing sample sentences described in SMIL. In this figure, the numbers on the left end (1, 2, . . . ) are the line numbers provided for clarification, and on the right end are explanatory sentences. These numbers and explanatory sentences are not described in the actual SMIL file.

The text surrounded by the number 1 and the number 15 is the SMIL document, and the contents thereof consists of a header portion shown between the number 2 and the number 8 and the body text shown between the number 9 and the number 14. In the header portion, layout information is described, which does not relate to time information. In the body text, time information is described, which relates to the actual media data and playback. The description shown by the number 11 is a control sentence for displaying video. In addition, the description shown by the number 12 is a control sentence for displaying static images. These are surrounded by <par>'s shown by the numbers 10 and 13. The parts surrounded by these <par>'s indicate that they play back at the same time. The present example indicates that the video and the static image play back at the same time. The location of media is described by "src." In addition, specification as to the playback time of media is described by "begin," "end," "dur," and such. In this case, "begin" specifies the media start time, "end" specifies the media end time, and "dur" specifies the media playback time.

In addition, the description shown by the number 11 indicates that the video data specified by "src" will be displayed for 3 to 20 seconds in the region shown as "a." The description shown by the number 12 indicates that the static image data specified by "src" will be displayed for 10 seconds in the region shown as "b." The playback start and end are specified by absolute time as in the descriptions shown by the numbers 11 and 12; however, they can be specified by means of sequence, as shown in below Examples (1) and (2).

EXAMPLE (1)

<seq>
<video    id="video1"    src="rtsp://example.com/video1.m4v"/>
<video    id="video2"    src="rtsp://example.com/video2.m4v" . . . />
</seq>

EXAMPLE (2)

<par>
<video    id="video1"    src="rtsp://example.com/video1.m4v"/>
<video id="video2" src="rtsp://example.com/video2.m4v" begin="video1.end". . . />
</par>

The descriptions of Examples (1) and (2) each indicate that video 2 will playback after video 1 finishes playback. Examples (1) and (2) both concern a case of video; however, the same applies to both video and static image.

Next, the actual operation between client and server in the above case will be described.

Figure 3:
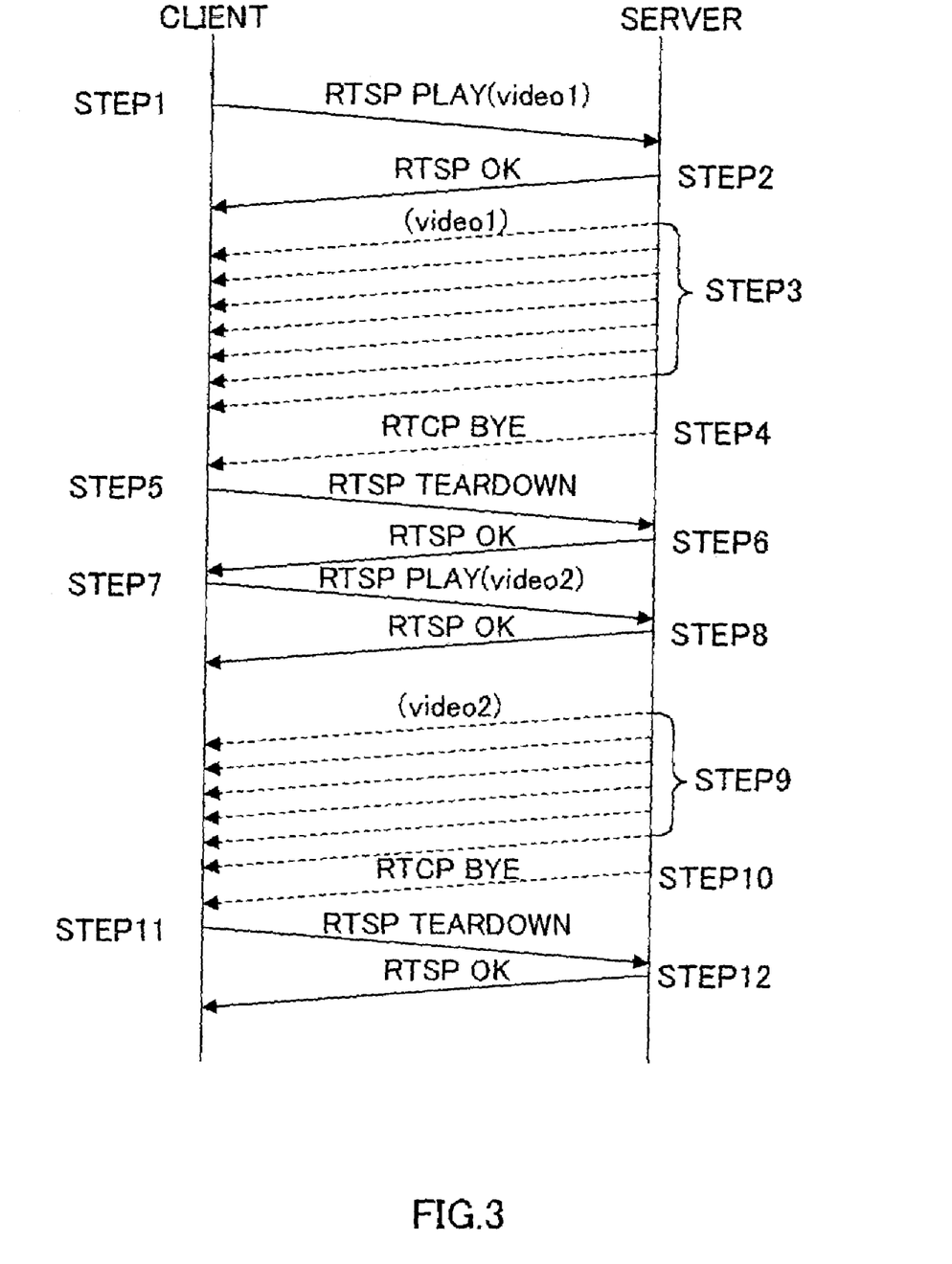
FIG. 3 is a sequence diagram illustrating a case of continuous media playback.
Figure 4:
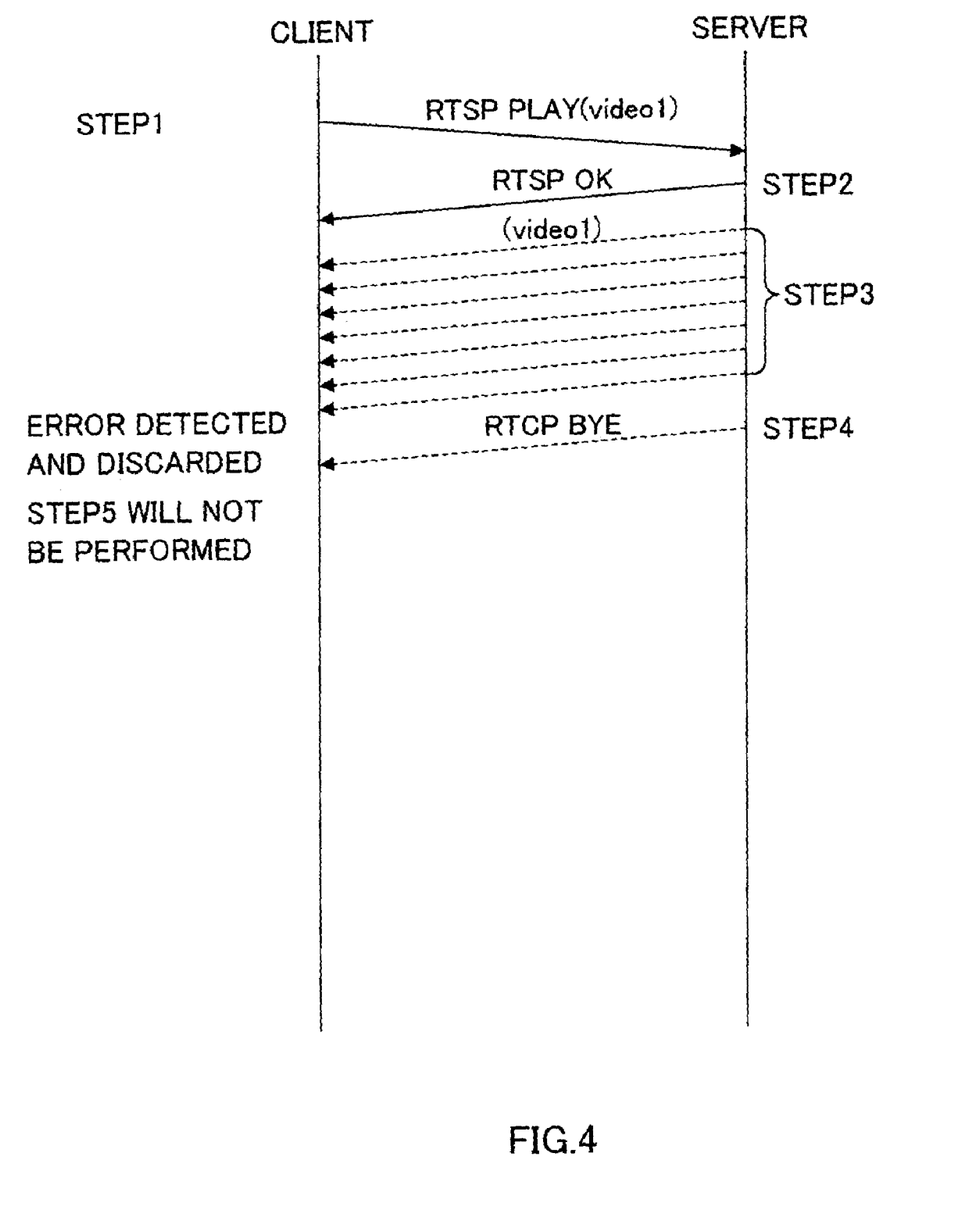
FIG. 4 is a sequence diagram illustrating a problem with conventional continuous media playback.

FIG. 3 is a sequence diagram illustrating an example of continuous media playback. In this figure, the solid line represents commands and response signals of RTSP (Real Time Streaming Protocol), which is a protocol used for real time data control. RTSP communicates via TCP. The dotted line represents media data. For the transmission of media data, the RTP protocol is used, which is suitable for real-time communication. The RTP protocol is also used to transmit commands that indicate the end of data.

Now, the client interprets the description in the SMIL document for playing back video 1 and thereafter requests the server for playback (Step 1). Upon receiving a playback request from the client, the server starts to prepare for a playback, and transmits an approval to the client when the playback preparation is mature (Step 2). After the approval is transmitted, the transmission of the data of video 1 starts (Step 3). Then, when all the data of video 1 has been transmitted, a control signal referred to as RTCP (RTP Control Protocol) BYE, specified by the RTP protocol, is transmitted to the client to notify that all the data of video 1 has been transmitted (Step 4).

Upon receiving the RTCP BYE, the client transmits a control signal referred to as RTSP TEARDOWN to the server to conclude the session (Step 5). The server, upon receiving the RTSP TEARDOWN command, concludes the session and notifies the client that the session has been completed (Step 6). After the playback of video 1 is completed, the client plays back video 2 in succession. From step 7 through step 12, the transmission of video 2 follows the same sequence as video 1.

However, this conventional packet receiving method has the following problem.

That is, when a bit error occurs with an RTCP BYE packet, which indicates the end of media data, during transmission of real time data such as sound data and video data using the RTP protocol, the RTCP BYE packet will be discarded by the client's lower layer. With the RTCP BYE thus discarded, the client has no way of knowing the end of the data, and, even when a data transmission is over, unable to start playing back the next media. Incidentally, a bit error during transmission can occur where, for instance, a radio channel is in use.

In addition, the disruption of media due to a burst error may terminate session.

SUMMARY OF THE INVENTION

The present invention aims to provide a packet receiving apparatus and a packet receiving method whereby the next media can start playback where an RTCPBYE, a media end notification packet, is not received due to a transmission error, and whereby temporary disruption of media due to a burst error does not terminate session.

The above aim is achieved by monitoring packet loss in the IP layer or in the UDP layer that are lower than an RTP receiver which is a receiver means for RTP packets.

BEST MODE FOR CARRYING OUT THE INVENTION

With reference to the accompanying drawings now, embodiments of the present invention will be described below.

Figure 5:
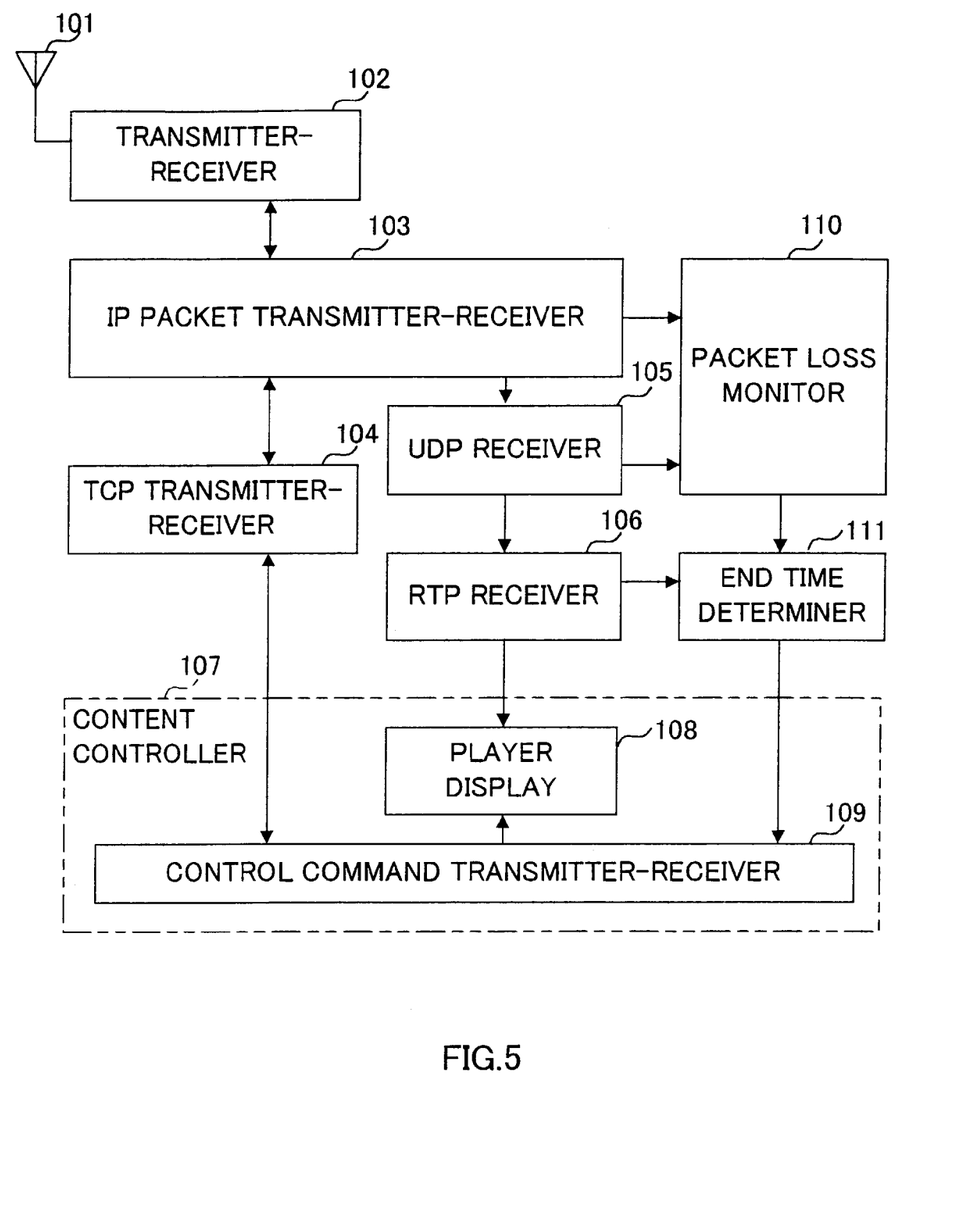
FIG. 5 is a block diagram showing a configuration of a content receiving and playback apparatus according to an embodiment of the present invention.

FIG. 5 is a block diagram showing a configuration of a content receiving and playback apparatus according to an embodiment of the present invention. In this figure, the content receiving and playback apparatus of the present embodiment comprises antenna 101, transmitter-receiver 102, IP packet transmitter-receiver 103, TCP transmitter-receiver 104, UDP receiver 105, RTP receiver 106, content controller 107, packet loss monitor 110, and end time determiner 111. Content controller 107 comprises player display 108 and control command transmitter-receiver 109.

Transmitter-receiver 102 performs radio processing (that is, down-conversion, A/D conversion, etc.) and demodulation processing of a received IP packet, and inputs the demodulated packet signal to IP packet transmitter-receiver 103. Then, transmitter-receiver 102 performs modulation processing and radio processing of the packet signal input from IP packet transmitter-receiver 103, and transmits the radio-processed IP packet from antenna 101.

If IP packet transmitter-receiver 103 finds an error in a received IP packet while performing IP packet transmission/ reception, IP packet transmitter-receiver 103 inputs the IP header of this IP packet into packet loss monitor 110 and furthermore discard this packet. In contrast, if a received packet has no error, the IP header of this IP packet is removed and thereafter the IP packet is input to TCP transmitter-receiver 104 in case of a TCP segment or to UDP receiver 105 in case of a UDP segment.

TCP transmitter-receiver 104 inputs the TCP segment input from IP packet transmitter-receiver 103 into control command transmitter-receiver 109 of content controller 107, and also inputs the the control command input from control command transmitter-receiver 109 of content controller 107 to IP packet transmitter-receiver 103 as a TCP segment. UDP receiver 105 checks the UDP segment input from IP packet transmitter-receiver 103 for error. If the UDP segment has an error, the header of this UDP segment is input to packet loss monitor 110 and thereafter the whole segment is discarded. In contrast, if the UDP segment has no error, the UDP segment is converted to an RTP packet and input to RTP receiver 106. RTP receiver 106 inputs this RTP packet into player display 108 of content controller 107. In addition, RTP receiver 106 reports the situation regarding RTP packet reception to end time determiner 111.

Control command transmitter-receiver 109 of content controller 107 receives a control command from a server (not shown in the figure) in a TCP/IP packet or transmits a control command to a server (not shown in the figure) using a TCP/IP packet, and instructs player display 108 to start or stop media playback in accordance with content description. Player display 108 plays back and displays the media data included in the RTP packet input from RTP receiver 106 in accordance with instructions from control command transmitter-receiver 109.

When end time determiner 111 recognizes that RTP receiver 106 has received a BYE packet indicative of the end of media, end time determiner 111 determines that the media has ended and inputs this BYE packet to control command transmitter-receiver 109. In addition, even where RTP receiver 106 does not receive a BYE packet, the end of media data transmission from the server (not shown in the figure) is determined based on packet loss information from packet loss monitor 110 and RTP packet reception situation information from RTP receiver 106, and control command transmitter-receiver 109 is instructed to stop the media. That is to say, where there is no packet loss and the situation where no packet is received continues for a certain period of time, the end of media data transmission from the server is determined, and control command transmitter-receiver 109 is instructed to stop the media. In such case, even if RTP receiver 106 has not received an RTP packet, end time determiner 111 does not determine the end of media data transmission, provided that a packet loss has occurred in a lower layer than the packet loss information. That is to say, if a packet loss has occurred in the IP layer or in the UDP layer, end time determiner 111 does not determine that the media data transmission has ended even where a certain period of time has passed with no RTP packet reception. Incidentally, the situation where RTP receiver 106 has not received an RTP packet and still a packet loss has occurred in the lower layer can occur where playback is repeatedly disrupted in player display 108.

Now an operation will be described regarding a case where a BYE packet is discarded due to an error and a client is not notified the media end time.

Figure 6:
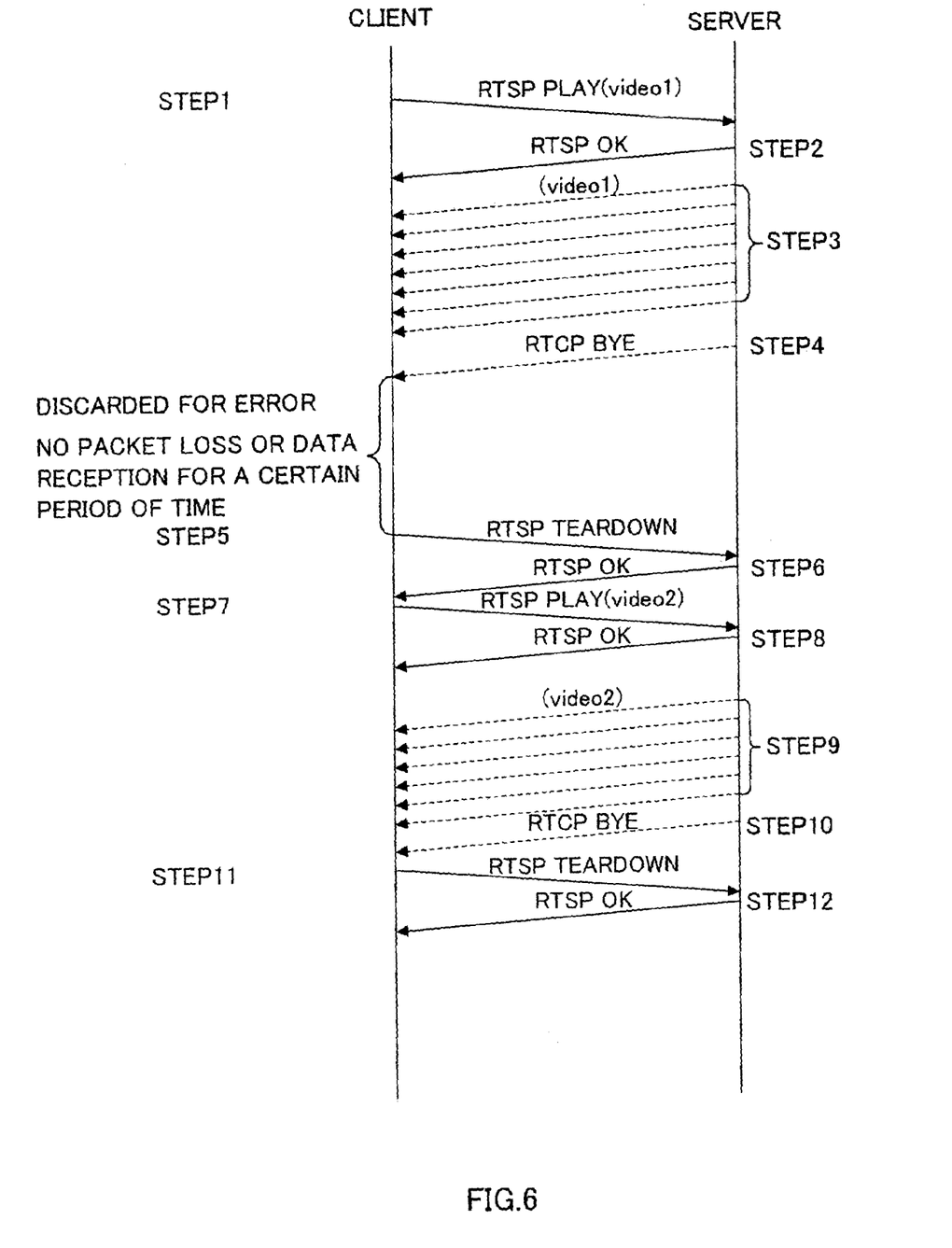
FIG. 6 is a sequence diagram illustrating an operation of continuous media playback of a content receiving and playback apparatus according to an embodiment of the present invention.

FIG. 6 is a sequence diagram showing an operation under the situation where a transmission error has occurred with a BYE packet. In this figure, step 1 through step 3 are identical to those in the sequence diagram of FIG. 3, and their detailed explanations will be omitted.

Referring to FIG. 6, when an error occurs with a BYE packet, the client end discards this BYE packet. Incidentally, the transmission of media data from the server has been already completed by this time, and the media data will no longer be transmitted. Still, the client has no way knowing whether the transmission of the media data has been completed. So the client maintains the condition to receive the media data for a certain period of time, and, if no media data is received during this period, determines that the media data transmission has been completed, and requests the server to conclude the session (step 5).

Next an operation will be described regarding a case where a burst error has occurred, which is known to occur frequently in radio channels. A burst error refers to an error pattern where transmission errors occur in a concentrated period of time.

Figure 7:
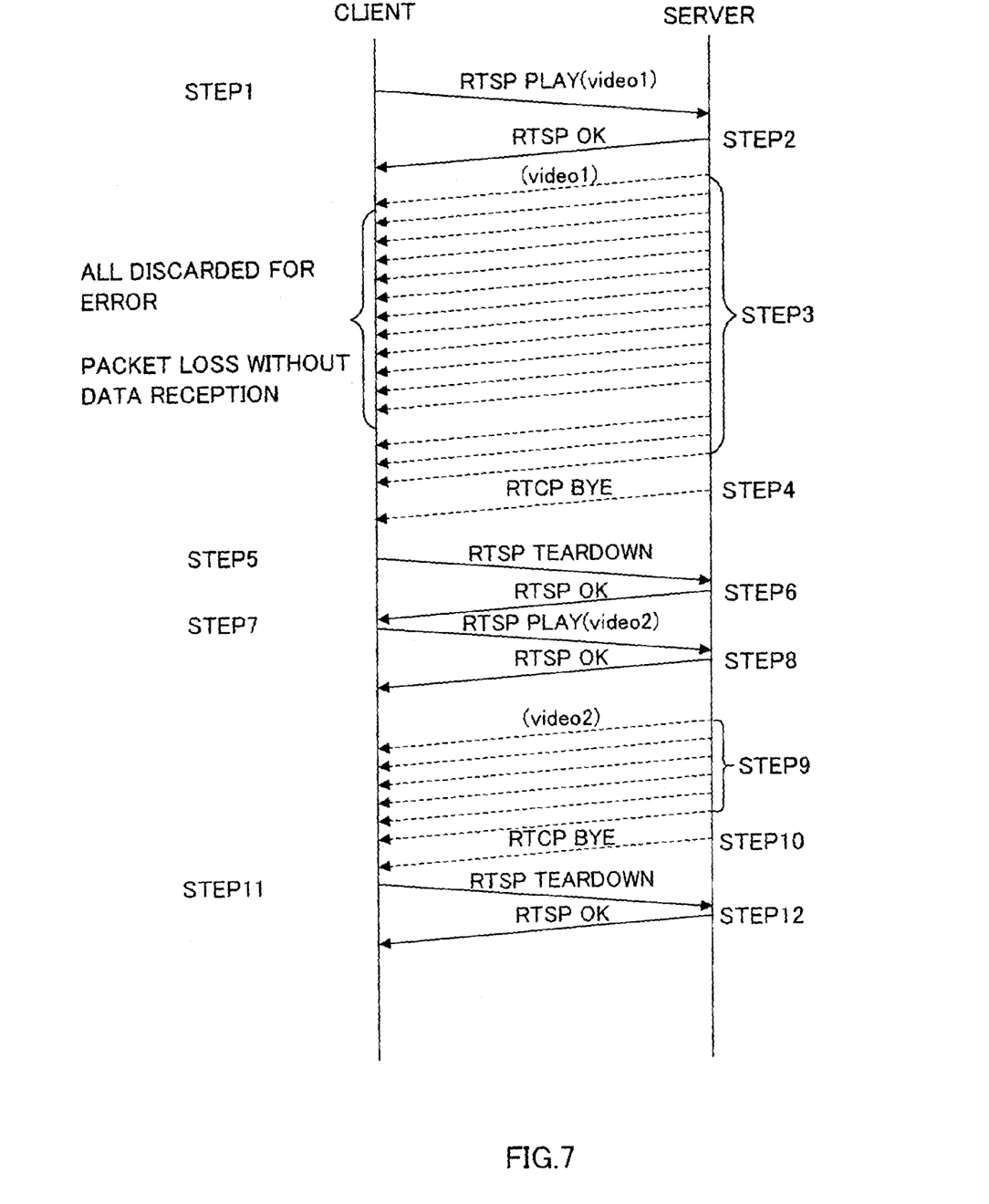
FIG. 7 is a sequence diagram illustrating an operation of continuous media playback of a content receiving and playback apparatus according to an embodiment of the present invention.

FIG. 7 is a sequence diagram illustrating the operation under the situation where a burst error has occurred in media packets during continuous media playback. In this figure, as in FIG. 6, media data is transmitted from the server to the client using a plurality of packets.

Referring to FIG. 7, if a burst error occurs while media data is transmitted from the server to the client, an error occurs with subsequent packets. When such error is detected in the IP layer or in the UDP layer, the whole media data will be discarded. During a burst error, RTP receiver 106 cannot receive the media data at all. While a packet error is occurring, packet loss information is output from the IP layer and the UDP layer, and end time determiner 111 determines that the reception of the media data is still in progress, or, in other words, does not determine that the reception of the media data has been completed. So, the condition to receive media data is maintained for a certain period of time. Then, the reception of media data resumes as the burst error ends.

Thus according to the present embodiment, when content without specified playback time is subject to playback and where a BYE packet indicating the end of media data is lost due to a transmission error, the end of media data transmission can still be determined if the condition of disabled media data reception continues for a certain period of time with no packet error detected during this period, and accordingly the reception of the next media data can start promptly.

Furthermore, provided that the wait state for media data reception continues even when a packet error or such due to a transmission error is detected, the situation can be avoided where playback stops by erroneous disruption of media data reception due to a burst error and such and where the subsequent data thus cannot be played back.

Figure 8:
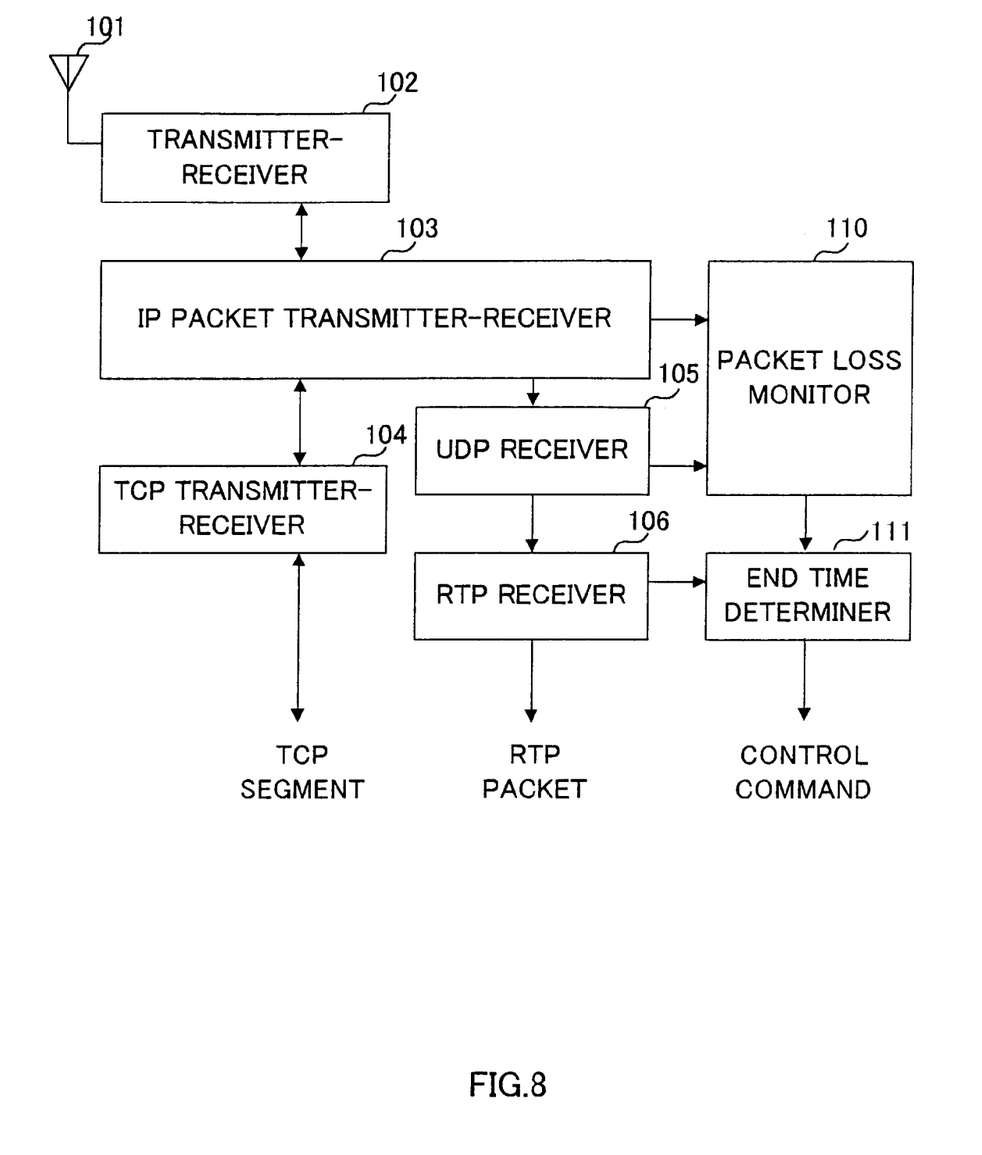
FIG. 8 is a block diagram showing a configuration of a packet receiving apparatus according to an embodiment of the present invention.

Incidentally, although the present embodiment has been described with reference to a content receiver-player that receives and plays back content, it is still possible to remove content controller 107 to make a packet receiver apparatus that only receives content. FIG. 8 shows a configuration of this packet receiving apparatus.

Moreover, although a case has been described with the present embodiment where content reception and playback are implemented using hardware, the present embodiment is not limited thereto, and the content reception and playback can be implemented using software as well. For instance, it is possible to store a program that implements content reception and playback in a computer-readable medium such as RAM (Random Access Memory) and operate a computer using this program. This packet receiving program comprises, for instance, the steps of receiving a packet transmitted from a server; detecting a transmission error of the packet received in said packet receiver; discarding the error packet detected in said error packet detector; receiving media data from a packet received without a transmission error in said packet receiver; and determining that transmission of said media data has been completed where, after said media receiver starts receiving said media data, a situation in which reception of said media data is disabled continues for a predetermined period of time, and where no packet error is detected in said packet detector during the period, and determining that transmission of said media data has not been completed where said situation in which reception of said media data is disabled continues for a predetermined period of time and where a packet error is detected in said packet detector during this period. Control through this software still achieves the same operation and effect as those by the above-described embodiment. That is to say, even if a loss of a packet that notifies the end of media data occurs due to a transmission error, determination is still made that media data transmission has been completed, provided that the situation of disabled media data reception continues for a certain period of time with no packet error detected during this period. By this means, it is possible to promptly start transmitting the next media data. Furthermore, given the wait state for media data reception continues where a packet is lost due to a transmission error and such, it is possible to minimize the situation where session is erroneously disrupted as media data reception is temporarily disrupted due to a burst error and such.

The recording medium for recording the above program can be semi-conductor memory means such as RAM, magnetic memory means, optical memory means, or optical magnetic memory means.

Although the present embodiment has been described using SMIL, the use of HTML is still possible. Also, a case is possible where media is simply repeatedly played back without content description, which, for instacne, corresponds to cases where a packet receiving apparatus continuously transmits a control signal RTSPPLAY to a server.

In addition, although a case has been described with the present embodiment where a number of media contained in content is subject to continuous playback, the present embodiment is applicable to cases where content is played back such that only one media is live-broadcasted. In case of live broadcasting, the end time is seldom explicitly indicated, and so playback of live broadcast content can be completed adequately through the use of the present invention.

As described above, the present invention enables adequate end time determination, even where content without specified playback time is subject to playback and where a BYE packet has not been adequately received. Furthermore, since end time determination is performed through the monitoring of packet loss even where playback has been disrupted due to a packet loss, it is possible to avoid the situation where the end of media data is erroneously determined and playback stops and where the subsequent data thus cannot be played back.

The present specification is based on Japanese Patent Application No. 2001-161398 filed on May 29, 2001, entire content of which is expressly incorporated by reference herein.

INDUSTRIAL APPLICABILITY

The present invention suits for use in an image distribution system that distributes real time media on a network such as images and sound.

The invention claimed is:

1. A packet receiving apparatus comprising:
   a packet receiver that receives packets transmitted from a server;
   an error packet detector that detects a transmission error of a packet received in said packet receiver;
   a packet canceller that discards an error packet detected in said error packet detector;
   a media receiver that receives media data from a packet received in said packet receiver without a transmission error; and
   a data end determiner that determines that transmission of said media data has been completed when said media data is not received in said media receiver for a predetermined period of time and only when no packet error is detected in said packet detector during the period.

2. The packet receiving apparatus according to claim 1, wherein said data end determiner determines that the transmission of said media data from the server has not been completed when said media data is not received in said media receiver for the predetermined period of time and only when a packet error is detected in said error packet detector during the period.

3. The packet receiving apparatus according to claim 1, wherein said packet receiver comprises:
   an IP packet receiver that receives an IP packet; and
   a UDP packet receiver that receives a UDP packet, wherein
   said media receiver receives a media end signal in an RTP packet obtained from said UDP packet receiver.

4. A communication terminal apparatus comprising the packet receiving apparatus of claim 1.

5. A content receiving and playback apparatus comprising:
   the packet receiving apparatus of claim 1; and
   a control command transmitter that transmits a session end command to a server when a notification of an end of real time data is issued because the media receiver in said packet receiving apparatus has not received a media end signal.

6. The content receiving and playback apparatus according to claim 5, further comprising a player display that plays back and displays the media data received in said media receiver in accordance with a content description language.

7. A packet receiving method comprising:
   determining that a session of media data transmission from a server is complete when the reception of media data discontinues for a predetermined period of time and only when no packet loss is detected in a UDP layer and in an IP layer, which are lower than an RTP receiver that receives the media data, during this period;
   determining that the session is not complete when the reception of media data discontinues for the predetermined period of time and only when a packet loss is detected in the UDP layer and in the IP layer during the period; and
   terminating the session when the session is determined to be complete.

8. A content receiving and playback program comprising:
   receiving packets transmitted by a server;
   detecting a transmission error of a received packet;
   discarding a received packet having a detected error;
   receiving media data from a packet received without a transmission error;
   determining that transmission of the media data is complete when the media data is not received for a predetermined period of time and only when no packet error is detected during the period; and
   determining that the transmission of the media data is not complete when the media data is not received for the predetermined period of time and only when a packet error is detected during the period.

* * * * *